M. L. & O. A. STRAY.
Fruit-Basket.
No. 7,915. Reissued Oct. 16, 1877.
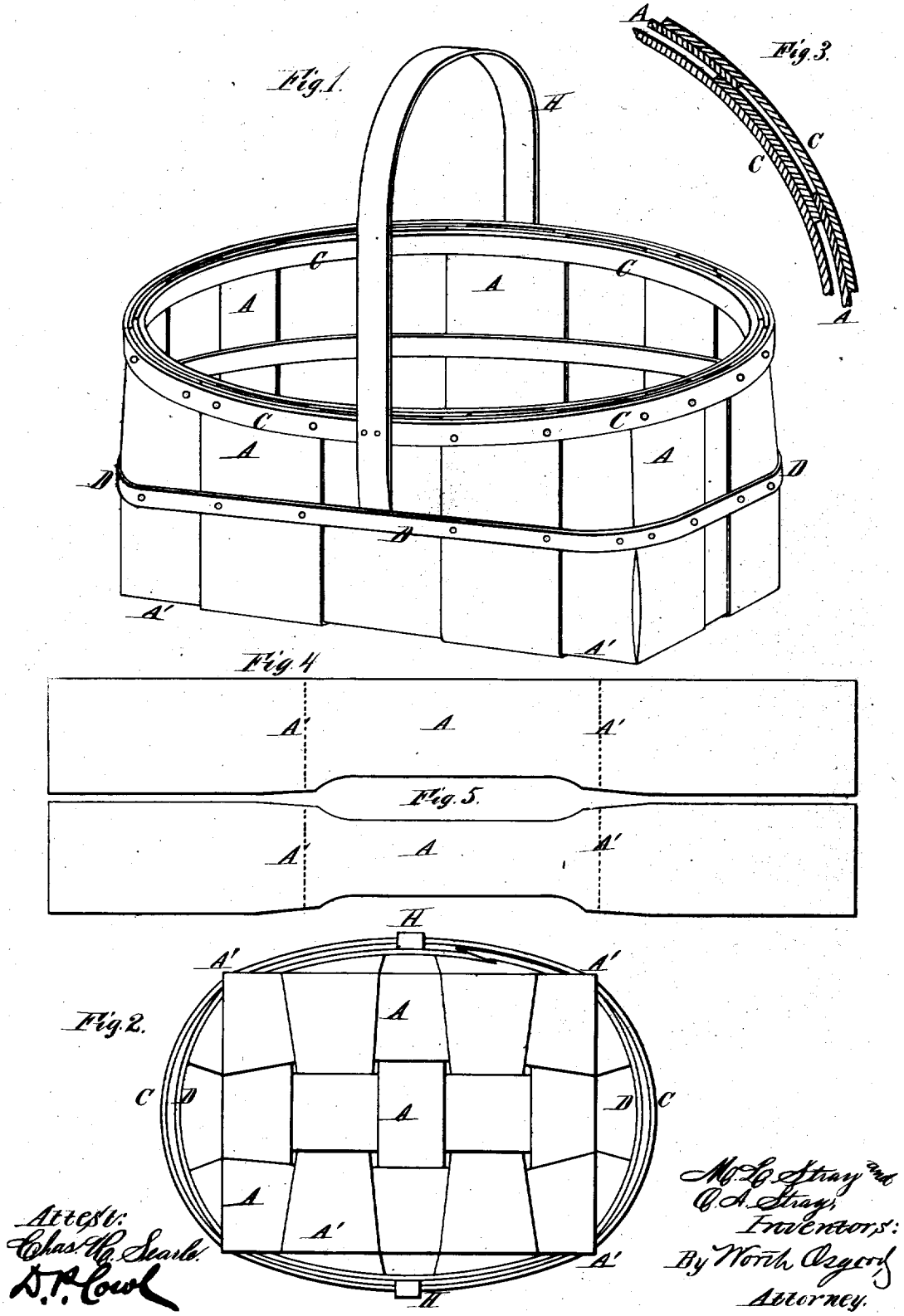
Witnesses:
Chas. H. Searle.
D. P. Lowe
M. L. Stray and
O. A. Stray,
Inventors:
By Worth Osgood
Attorney.

UNITED STATES PATENT OFFICE.

M. L. STRAY AND O. A. STRAY, OF EUCLID, OHIO.

IMPROVEMENT IN FRUIT-BASKETS.

Specification forming part of Letters Patent No. 59,290, dated October 30, 1866; Reissue No. 7,915, dated October 16, 1877; application filed September 3, 1877.

*To all whom it may concern:*

Be it known that we, MICHAEL L. STRAY and ORRIN A. STRAY, at present residing at Euclid, in the county of Cuyahoga and State of Ohio, have jointly invented certain new and useful Improvements in Fruit-Baskets, of which the following is a full, clear, and exact description, reference being had to the accompanying drawing, and to the letters of reference marked thereon.

Figure 1 is a perspective view of our improved basket as it appears when completed and ready for use; Fig. 2, a plan of the under side thereof; Fig. 3, a horizontal section of a fragment of the upper part, illustrating the method of forming the vertical walls by overlapping the edges of the adjacent splints; and Figs. 4 and 5 are plan views of the splints as they appear when flattened out or before being bent up to form the vertical walls (or sides and ends) of the basket.

Like letters in all the figures refer to corresponding parts.

The object of our invention is to produce a cheap and substantial basket suitable for carrying very small fruits, &c.; and the invention consists in certain details of construction and arrangements of parts, all of which will be hereinafter first fully described, and then pointed out in the claims.

The splints or strips A A, &c., form the bottom of the basket, which may be made of the ordinary material, and of the usual form and size. They are bent upwardly from the edges A′ A′, &c., of the bottom, and at nearly right angles thereto, to form the walls; and, in order that both the bottom and the walls may be made tight and close, these strips are cut away upon one or both edges, so that they shall be wider at their ends than in the center or along their middle portions, as plainly shown in Figs. 4 and 5.

Having laid the strips so that the bottom shall be tight and close, and practically flat, the ends are next bent up at nearly right angles with the bottom, and confined at top by the bands C C, care being taken to lap the edge of one strip over that of the one next adjoining, as indicated in Fig. 3. This forms the whole body of the basket, the joints being close to retain the small fruit, and the bottom being flat and rectangular in shape, necessarily, from the manner of laying and bending the splits.

It is obvious that if these splints were not overlapped, as stated, but simply made to touch each other at their edges, as in the ordinary way of constructing baskets, the bottom would be open more or less, according to the amount of material cut out of the center of said strips; and if the parts composing the sides and ends do not overlap, the joints are liable to open from shrinkage of the material, or from outward pressure of the contents of the basket. Hence, under the present construction, the completed article is regarded as more firm and durable than any other form of which we have knowledge, except, of course, the highly-expensive baskets.

The invention is to be carefully distinguished from this expensive style, its object being, as previously stated, to form a cheap basket, and one specially adapted for the carrying of very small fruits.

The rectangular shape and practically flat bottom afford numerous advantages over that class of baskets intended for heavier articles, wherein the strips all cross at a central point, necessitating a circular form, a very rough, thick, and uneven bottom, and a clamping-pin at the central point to prevent displacement of the strips. Aside from the cheapness alluded to, the most notable advantage of the present style over the more expensive sorts is the facility with which the baskets may be "nested," occupying practically all the space in the "nest," thus economizing room and obviating disarrangement, which would be liable to occur in case the article were made circular. These advantages at this date are recognized as essential attributes of all baskets for small fruit.

The strips which form a portion of the bottom and ends of the basket are laid at right angles to the remaining strips, and those strips which run in parallel directions are lapped at their edges, to form the close walls. The corners are formed, as indicated in Fig. 1, by lapping one of the end splints beyond the next adjacent side splint.

The device is strengthened by a second wooden band, D, passing around it; or, instead of this band, a wire can be used, passing from the inside to the outside through the strips. Only one wire is necessary under this modification.

The upper band should be composed of two parts, one upon the inside and one upon the outside of the basket.

Having thus fully described our invention, what we claim as new, and desire to secure by Letters Patent, is—

1. In a basket of the character herein specified, the combination of splints forming, severally, portions of the bottom and walls of the basket, the same being at right angles to each other at the flat bottom of the basket, and angularly bent upward, and overlapped at their vertical edges to form the upright walls of said basket, substantially as shown and described.

2. In a basket of the character herein specified, the combination of splints at right angles to each other, the same being bent up vertically at the edge of the flat bottom, and one being lapped beyond the other to form the corner of the rectangular basket, in the manner shown and described.

3. As a new article of manufacture, the herein-described rectangular fruit-basket made up of two series of cut-away splints at right angles to each other, and in each series adjacent to each other, the adjacent splints of each series overlapping at their edges to form the upright walls of the basket, the several parts being secured and arranged substantially as shown and described.

In testimony that we claim the foregoing we have hereunto set our hands in the presence of two witnesses.

M. L. STRAY.
O. A. STRAY.

Witnesses:
JOSEPH GORHAM,
E. P. HASKELL.